United States Patent Office 3,278,928
Patented Oct. 11, 1966

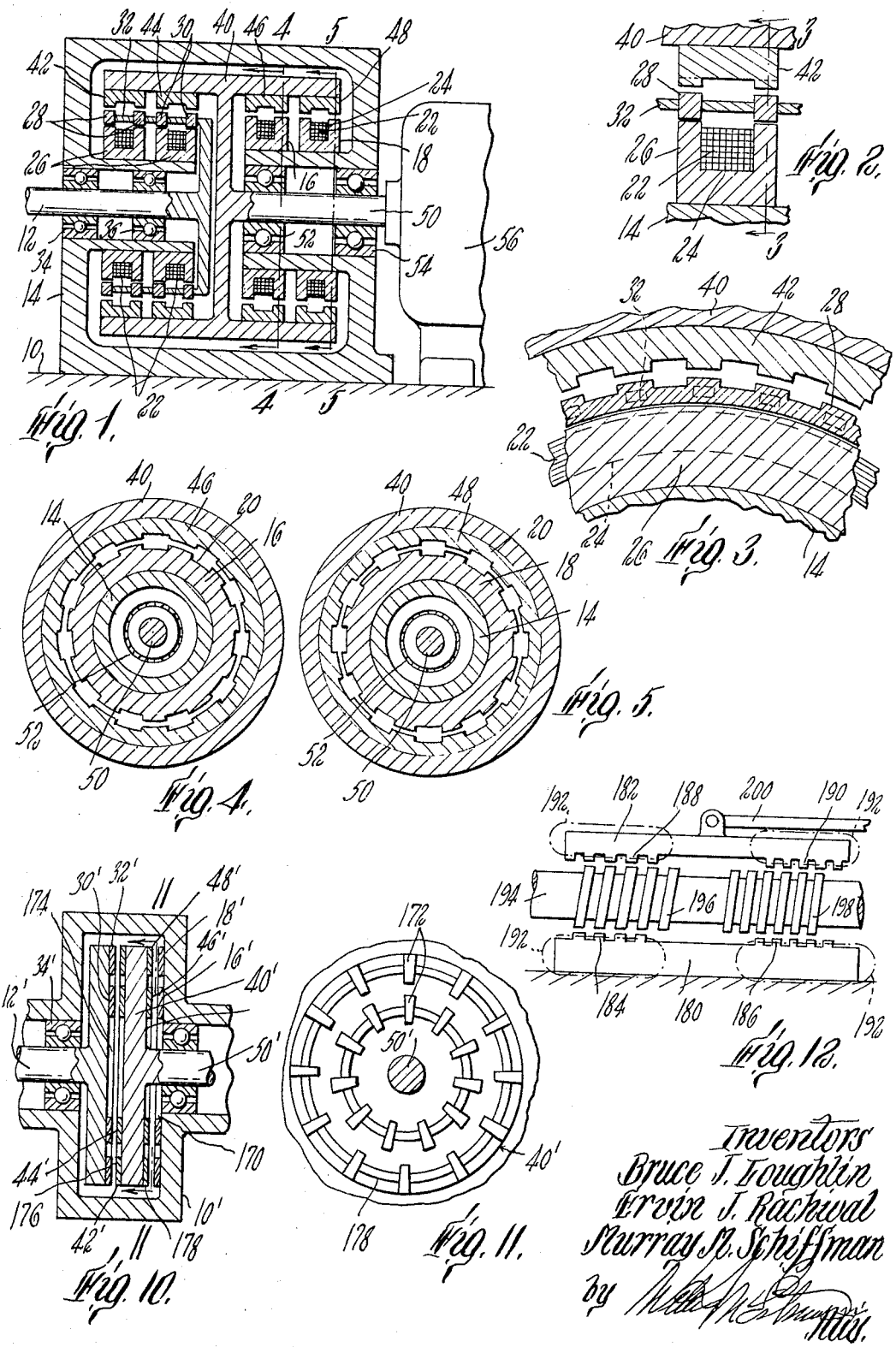

3,278,928
POSITION ENCODING APPARATUS
Bruce J. Loughlin, South Acton, Ervin J. Rachwal, Holbrook, and Murray M. Schiffman, Newton, Mass., assignors to Data Technology, Inc., Cambridge, Mass., a corporation of New York
Filed Feb. 16, 1961, Ser. No. 89,793
24 Claims. (Cl. 340—347)

This invention relates to position measuring apparatus and more particularly to an improved position encoding apparatus and to logic circuitry associated therewith.

It is frequently desired to establish the relationship between two positions of two objects relative to one another with a high degree of precision. Such a requirement is encountered in inertial guidance systems where it is desired to know the position of a shaft relative to a fixed reference point with a high degree of accuracy. In such systems it is frequently required that means be provided to enable periodic read-out of the accurate positional information indicative of the shaft position in a form suitable for manipulation by the associated equipment. While a variety of systems for performing such measurements have been proposed those position indicating systems commonly employ massive and delicate equipment in order to achieve the desired result when precise positional information is required. Such systems require very careful handling and regular alignment checks in order than they may maintain the requisite degree of accuracy in the measurements.

It is an object of this invention to provide an improved, compact and rugged position encoding device which provides a digital read-out of the position being measured with a high degree of accuracy.

Another object of the invention is to provide an improved shaft position indicating apparatus.

Another object of the invention is to provide an improved precision position encoding device which incorporates vernier principles with full scale read-out and inherent signal averaging of this read-out position indication.

Another object of the invention is to provide an improved position indicating system which enables automatic cyclic read-out.

A further object of the invention is to provide in combination with an improved position indicating apparatus logical circuitry which eliminates points of ambiguity n the read-out information in an automatic manner.

A further object of this invention is to provide, in combination with a position encoding device having an automatic cyclic position read-out, novel means for updating the position indication between cyclic read-out operations.

A still further object of the invention is to provide, in combination with a position, encoding device, means for synchronizing a read-out request signal with the initial digital information signal so as to coordinate with resulting improved accuracy the read-out position indication relative to the request signal.

In accordance with a preferred embodiment of the invention there is provided a shaft position indicator or encoder having a reference member or stator and an input element which is driven by the shaft whose position is to be measured. Each of these members has two sets of similar transducer tracks on them, one track of each set having one more segment or element per angle than the other track. A rotor member has four similar transducer tracks aligned with and positioned immediately adjacent the corresponding tracks on the stator and on the input element. Suitable means such as a synchronous motor is utilized to drive the rotor tracks past the stator and input member tracks. When certain dynamic systems are being supervised means are provided to adjust the rotor drive so that accurately timed position information is generated.

As the rotor tracks are driven past the tracks of the stator and input members a series of periodic signals is generated from each element in each stator and input track and these series are combined to provide an automatically averaged signal. Detection and logic circuitry associated with the apparatus amplify, shape and interpret the averaged signals and generate in a cyclical manner a fine count and a coarse count which indicate the relative position of the stator and the input member. Areas of possible ambiguity in the coarse signal indication are also automatically eliminated by the logic circuitry. In addition, where a position indication read-out register is utilized there may be provided means to automatically update the position indication in that register between periods of read-out of the indication. The transducers employed in the position encoder may utilize a variety of different configurations, specific examples of variable capacitance and variable reluctance systems being described and illustrated herein. The apparatus provides an accurate indication of the relative position in the form of an immediately available digital read-out. It is a compact, reliable device capable of a variety of applications. Additional features, objects and advantages of the invention will be seen as the following description of preferred embodiments thereof progresses in conjunction with the drawings, in which:

FIG. 1 is a side elevation sectional view of a simplified form of position encoding apparatus according to a first embodiment of the invention which utilizes variable reluctance principles;

FIG. 2 is an enlarged sectional view illustrating the flux path through the two adjecnt transducer tracks as generated in the variable reluctance device shown in FIG. 1;

FIG. 3 is a diagrammatic end elevational view of a portion of the rotor and stator tracks of the apparatus shown in FIG. 1 illustrating the notch configuration of those tracks;

FIG. 4 is a sectional view taken along the line 4—4 of FIG. 1 of a first set of rotor and stator tracks;

FIG. 5 is a sectional view taken along the line 5—5 of FIG. 1 of the second set of rotor and stator tracks;

FIG. 10 is a sectional view illustrating a second shaft position encoder embodiment of the invention which utilizes variable acapacitance transducer principles;

FIG. 11 is a diagrammatic view of the rotor member of the variable capacitance device taken along the line 11—11 of FIG. 10; and FIG. 12 is a diagrammatic view of a third embodiment of the invention which employs a variable reluctance transducer configuration that enables measurement of linear relative motion.

Figure 6:
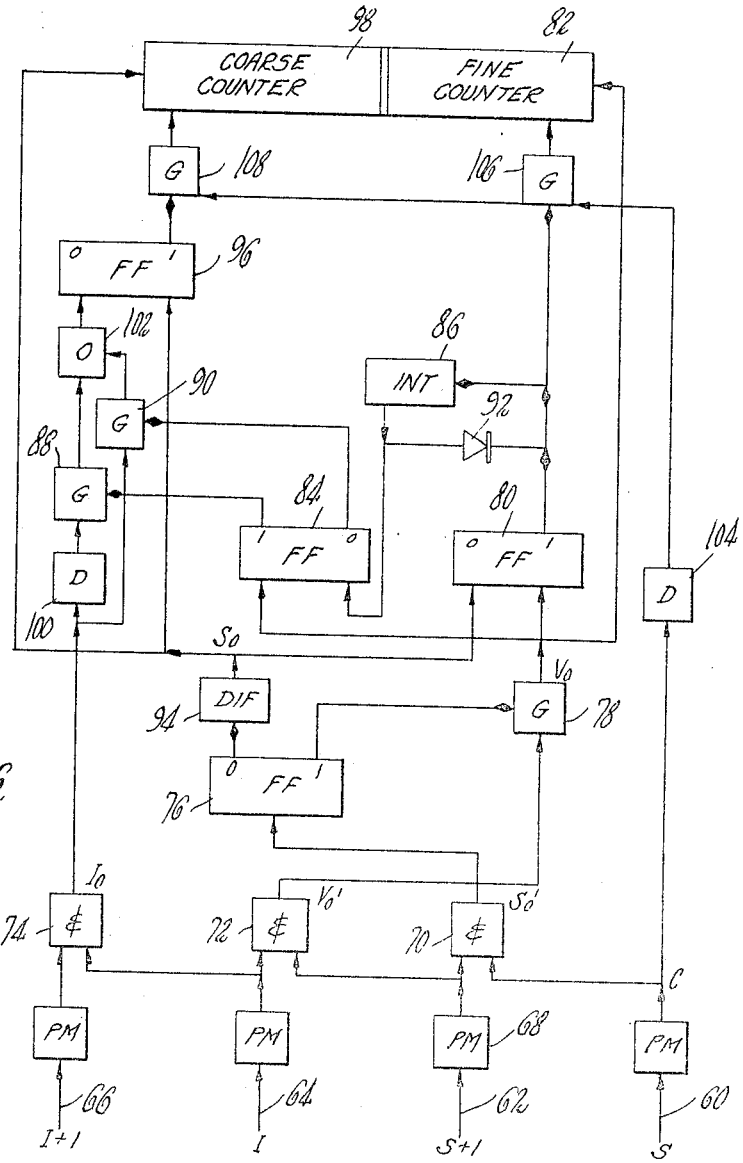
FIG. 6 is a schematic logical block diagram of the logic circuitry utilizing the detection counting and ambiguity elimination associated with the apparatus of the invention.

With reference to FIG. 1 there is illustrated a shaft position encoding apparatus for indicating the position of a shaft relative to a fixed reference point. In this diagram the fixed reference point is the base 10 and the shaft whose position to be indicated is the shaft 12. Secured to the base 10 is a stator member 14 which has two sets 16, 18 of transducer tracks mounted thereon. Each transducer track is machined from magnetic material and has a plurality of evenly spaced notches 20 in the periphery of the upstanding wall portions thus forming a series of teeth. Track 18 has one more notch in each wall portion than the track 16 as indicated in FIGS. 4 and 5. In a preferred embodiment each wall of track 16 has 256 notches and each wall of track 18 has 257 notches. However, for clarity of the disclosure in the drawing these walls have been shown as having eleven and twelve notches respectively. A coil of wire 22 is positioned in the groove 24 of each track on the stator.

A similar structure is associated with the input shaft 12. Two channels 26, each carrying a coil 22 of wire, are fixedly mounted on the stator structure. Notched disc structures 28, 30 are positioned immediately adjacent the channels and are supported by a non-magnetic spacer 32 such as aluminum or a suitable stainless steel in proper spaced relation (running clearance). Each disc 28 has eleven notches and each disc 30 has twelve notches. Thus, the combination of the channels and the notched discs provide a structure similar to the stator tracks 16, 18. While the entire input track structure might be mounted on the shaft 12 it is preferred to separate the channels and the discs in the manner illustrated so that the signal induced in the coils 22 may be more easily brought out for application to logic circuitry. The notched discs 28, 30 and spacer 32 are mounted on the input shaft 12 and are rotatable relative to the stator, being supported in coaxial relation to the stator structure by bearing assemblies 34 and 36. It will be noted that the effective peripheral surface of the stator and input tracks are aligned with each other. A detail of a modified structure utilizing this input track configuration is shown in FIGS. 2 and 3.

A rotor member 40 carries four sets 42, 44, 46, 48 of tracks, each of which is positioned to the outside of and in alignment with a corresponding stator or input track 16, 18, 28 and 30 and each is correspondingly notched. Thus, in the illustrated embodiment, the walls of track sets 42 and 46 have eleven notches in their periphery and the walls of track sets 44 and 48 have twelve notches in their periphery. The rotor and rotor tracks is a permanent magnet structure which generates a flux field that bridges across the air gaps between the rotor tracks and corresponding input or stator tracks. This rotor member is mounted on the shaft 50 which is supported in the stator casing by bearings 52 and 54 and is driven by synchronous motor 56. Other types of rotor drive, commensurate with the nature of the desired position indication operation, may be utilized.

As the tracks on the rotor member are driven past the stator and input tracks a pulsating flux signal is generated due to the changing air gap configurations. Effectively four sets of signal trains (S, S+1, I, I+1) are generated, each train being generated from a multiplicity of points on each pair of tracks. The sets of signal trains are inherently synchronized with respect to one another and are automatically averaged in this apparatus since, in effect, a multiplicity of sensing heads are being moved relative to a transducer track and errors due to small variations in the locations of the notches thus will tend to cancel one another due to the very nature of the machining process. In the illustrated embodiment there are trains (S, I) of eleven pulses produced from track sets 16 and 28 and trains (S+1, I+1) of twelve pulses each are produced from tracks 18 and 30 during each complete rotation of the rotor. The pulsating flux induces a voltage in the associated coil 22 which in turn produces a sinusoidally varying current. These current signals are translated into pulses and utilized to provide the desired position indications.

With reference to FIG. 6, the signal train (S) from stator track 16 is applied on line 60 while the signal train (S+1) from stator 18 is applied on line 62. In similar manner the signal train (I) from input member track 28 is applied on line 64 and the signal train (I+1) from input member track 30 is applied on line 66. Each sinusoidal signal train is applied to a pulse making circuit 68 which senses the signal train and translates it into a corresponding series of pulses. These circuitries may include an amplifying stage, a squaring circuit and a differentiating circuit to provide a suitably shaped pulse and it is preferred to generate the pulse coincident with the zero crossing of the signal current as is conventional in circuitries of this type. The S and S+1 pulse trains are applied to coincidence circuit 70, the I and S+1 trains are applied to coincidence circuit 72 and the I and I+1 trains are applied to coincidence circuit 74. These coincidence circuits may be conventional diode AND circuits which provide an output only in response to the coincidence of input pulses. The output of AND circuit 70 is denominated $S_O'$ (coincidence of pulses of the two stator signal trains—stator reference), the output of AND circuit 72, $V_O'$ (coincidence of a stator pulse and an input pulse—vernier indication) and the output of AND circuit 74, $I_O$ (coincidence of the pulses of the two input signal trains—input reference). In addition the signal train applied on line 60 is converted to counting pulses C.

As the rotor 40 turns, there is one point in the revolution at which there is a coincidence between the notches on the two stator tracks and the corresponding notches on the rotor tracks and this point establishes a reference point. AND circuit 70 has an output when this point of coincidence between the S and S+1 signal train is sensed and that output ($S_O'$) is applied to the complement input of counter select flip-flop 76. When that flip-flop is set it has an output level which conditions gate 78. The next $V_O'$ is passed as a $V_O$ pulse to set the Fine counter control flip-flop 80, to reset the Fine counter 82 and to set the ambiguity control flip-flop 84. The output of the set flip-flop 80 is also applied through integrator 86 so that after approximately one-tenth rotor cycle time the output of integrator 80 clears flip-flop 84. In the set condition flip-flop 84 conditions gate 88 and in the cleared condition it conditions gate 90.

The next $S_O'$ (stator reference) pulse from AND circuit 70 resets flip-flop 76 so that it applies an output level to differentiating circuit 94 to generate an $S_O$ pulse which sets the flip-flop 96 and resets the Coarse counter 98 and the flip-flop 80. When flip-flop 80 is reset, diode 92 provides a quick discharge path for integrator 86 so that it is readied for use from a discharged condition during the following read-out cycle.

The next $I_O$ (input reference) pulse generated by AND circuit 74 is applied to gate 90 and is also applied through delay circuit 100 to gate 88 and is passed by one of these gates through OR circuit 102 to reset flip-flop 96. As mentioned above, the S pulse applied on line 60 to the pulse making circuit 68 is also utilized as a count pulse (C) and is applied through delay unit 104 to sample counter input gates 106 and 108 (which are conditioned respectively by the set flip-flops 80 and 96). If flip-flop 80 is set the count pulses step the Fine counter 82 and if flip-flop 96 is set the count pulses step the Coarse counter 98. The delay afforded by delay unit 104 may be approximately one quarter of a count pulse interval while the delay introduced by delay unit 100 is approximately twice that amount.

Figure 7:
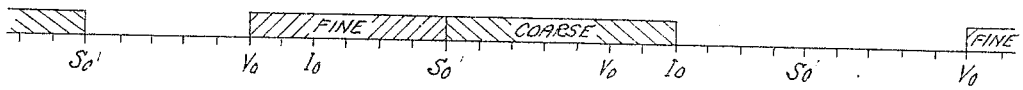
FIG. 7 is a timing diagram illustrating the operation of the logic circuitry.

A timing diagram of the operation of the encoder logic is shown in FIG. 7. Assume that the counter select flip-flop 76 is initially in the reset state. An $S_O'$ pulse passed by AND circuit 70 complements that flip-flop so that it provides an output level which conditions gate 78. As indicated above, this $S_O'$ pulse thus establishes a reference point of the position of the rotor with respect to the stator and the operation readies the logic for Fine counter operation. The next $V_O'$ pulse which is generated (at the point of coincidence between the I train of pulses and the S+1 train of pulses) indicates the vernier point of coincidence between the stator and the input member. This pulse is passed by the conditioned gate 78 as a $V_O$ pulse to set flip-flops 80 and 84 and to reset the Fine counter 82. The setting of flip-flop 80 produces an output level which conditions gate 106 and starts to charge up integrator 86. Count pulses as delayed by delay unit 104 (which is utilized to locate in time the last coarse count pulse in any given cycle between the $I_O$ undelayed and the $I_O$ delayed pulses, and incidentally insures resolution of the flip-flops, before initiating counting operations) are then passed through gate 106 to step the Fine counter 82. This count provides an accurate vernier indication of the location of the input shaft 12 relative to the stator 14 at the instant that the $V_O$ pulse was generated. The Fine counter is stepped until the next $S_O'$ pulse passed by AND circuit 70 complements the flip-flop 76. The complementing of flip-flop 76 conditions the differentiating circuit 94 to generate an $S_O$ pulse which resets flip-flop 80, deconditioning gate 106, terminating the fine count. The $S_O$ pulse also sets flip-flop 96 and resets Coarse counter 98. When flip-flop 96 is set gate 108 is conditioned and the count pulses then are passed through gate 108 to step the Coarse counter 98. Gate 108 remains conditioned until the flip-flop 96 is cleared by an $I_O$ pulse from AND circuit 74 which is passed either by gate 88 or gate 90 through OR circuit 102. Gate 90 is conditioned when the fine count gate 106 is conditioned more than one-tenth rotor cycle and in such circumstances the $I_O$ pulse is effectively advanced in time to insure the next coarse count pulse is not recorded. However, if gate 106 is conditioned less than one-tenth cycle (indicating a small vernier increment) the integrator 86 does not clear the ambiguity control flip-flop 84 and gate 88 is conditioned so that the $I_O$ pulse, delayed by unit 100, is effective to terminate the coarse count and recording of the last coarse pulse is insured. This coarse count gives a gross digital indication of the position of the shaft 12 with respect to the stator 14 and is a gross digital indication of the angular relation of the stator and input member.

The rotor cycle is repetitive and fine and coarse counts are made during successive revolutions of the rotor 40. A cycle is initiated at the point of coincidence between the two stator tracks and the corresponding rotor tracks ($S_O'$). At $V_O$ a coincident point is detected between the $S+1$ pulse train and the input pulse train I. The Fine count is then initiated and the counter 82 is stepped until the next S pulse which simultaneously resets flip-flop 80, terminating the fine count, and sets flip-flop 96, commencing the Coarse count. The Coarse count continues until the $I_O$ pulse is generated (upon detection of coincidence between the input element tracks and the corresponding rotor tracks) at which time the flip-flop 96 is cleared, terminating that count.

As indicated above, the $S_O$ pulse provides a stator reference and the $I_O$ pulse provides an input member reference. The number of counts generated as the rotor moves between these two locations is a gross indication of the relative position of the input member relative to the stator. A vernier count recorded by the Fine counter 92 provides the indication of exact position with great precision. By choice of the inputs I and $S+1$ the $V_O$ indication precesses in the direction opposite to the movement of the input shaft and permits the same $S_O$ pulse to be used to terminate the vernier count and to initiate the gross count.

In the illustrated apparatus, a read-out graph of which is shown in FIG. 7, eleven count pulses are generated during each rotor cycle. The coarse indication is 7/11 and the fine indication is 6/11. Thus the indicated angular position of the shaft is $7/11+6/11$ $(1/11)=83/121$. It will be obvious that other count intervals, such as 100, 360, or 1000, would frequently produce more readily useful information. However, the principles of the invention are demonstrated by the simplified illustrative example.

Flip-flop 84 in conjunction with integrator 86 enables ambiguities which occur when the Fine count is either a small fraction or a large fraction of the cycle to be eliminated. If the Fine count is small the $I_O$ pulse is delayed to insure inclusion of the final Coarse count while if it is large the $I_O$ pulse is effectively advanced in time to insure exclusion of the next Coarse count. This ambiguity determination is effectively made by sensing the size of the preceding Fine count as stored by flip-flop 84. With reference to the circuitry shown in FIG. 6, the flip-flop 84 is set by the $V_O$ pulse and when the Fine count is small (so that flip-flop 84 cannot be reset by the integrator 86) gate 88 remains conditioned and the $I_O$ pulse is delayed by delay unit 100 (two delay periods rather than the single delay period accorded C pulses by unit 104) to insure the inclusion of the count applied via gate 108 to the counter 98 before flip-flop 96 is cleared. If the Fine count is larger, however, the $I_O$ pulse is not delayed and the flip-flop 96 is reset immediately by $I_O$ so that exclusion of the next C pulse is insured. Thus this logic circuitry provides a continuous and substantially immediate digital indication of the position of one member relative to another with an exceptionally high degree of accuracy and with automatic elimination of points of ambiguity.

Figure 8:
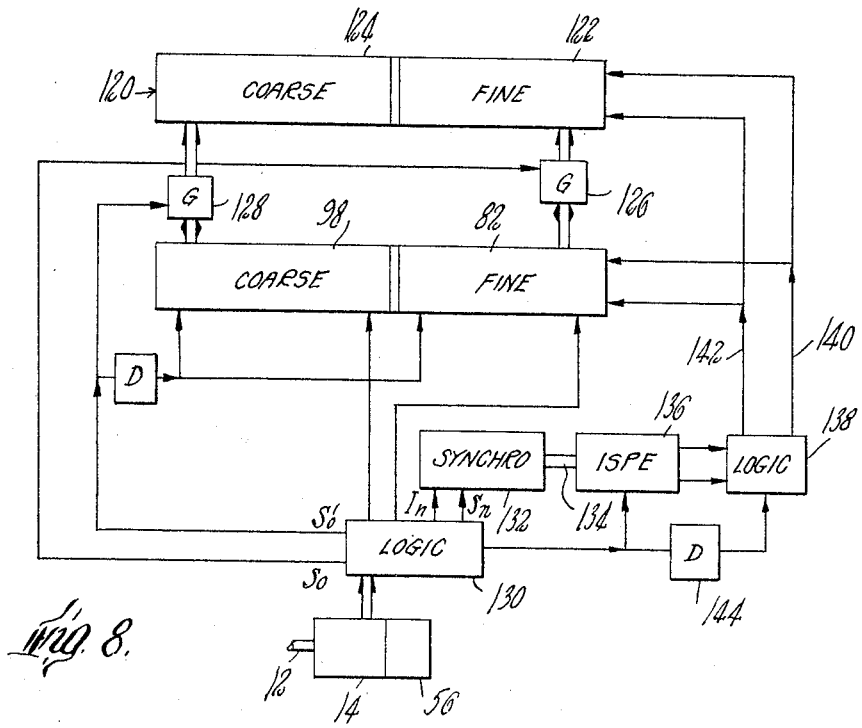
FIG. 8 is a diagram illustrating logic utilized in a system employing a read-out register for updating the position indication generated by the encoder.

An amplified logic arrangement, shown in FIG. 8, utilizes a read-out register 120 having a fine section 122 and a coarse section 124, each having stages corresponding respectively to the Fine counter 82 and the Coarse counter 98. The contents of the counters are transferred to the read-out register after each count is completed through gates 126, 128 by the $S_O$ and $S_O'$ pulses respectively. This read-out register provides a digital indication of the positions of the elements being sensed for substantially longer intervals than is possible through the utilization of the Coarse and Fine counters alone. It will be seen that the Fine and Coarse counters could be utilized in a similar arrangement with switching logic operative so that position information would be available after each rotor cycle, rather than after every two rotor cycles.

The elements whose relative positions are being measured may be subjected to accelerational movements of large magnitude and it may be desirable to update the indication provided by the logic of FIG. 6 between the intervals of cyclic read-out. In such cases the Coarse and Fine counters may be connected together and arranged to both count up and count down. The read-out register is similarly arranged as an up-down counter. In the diagram of FIG. 8, the sinusoidal signal trains $I_n$ and $S_n$ (from tracks 28 and 16 respectively) of the digital position encoder (indicated generally by the reference numeral 130) are applied to a synchro 132 which is responsive to the phase difference between the $I_n$ and $S_n$ signals. The output of the shaft 134 of the synchro turns in response to a sensed change in phase between these signals. The synchro thus senses the direction of movement of the element whose position is being supervised bye the digital position encoder 130. An incremental shaft position encoder 136 is utilized to sense the movement of the synchro shaft. This shaft encoder, which may have two sensing heads positioned 90° apart, senses the shaft movement and produces a set of signals which are resolved by logic circuitry 138 and a counter stepping pulse is generated for application on line 140 to step the counters up or on line 142 to step the counters down depending on the sensed movement of the supervised elements. Each count pulse C from the shaft encoder circuitry 130 is applied to the encoder 136, and gates the synchro shaft position information to the logic 138 and that count pulse delayed one half interval by delay 144 also gates any generated counter stepping pulse. This pulse delay arrangement avoids conflict between the count pulses from the encoder 130 and by a stepping pulse from the logic 138.

Figure 9:
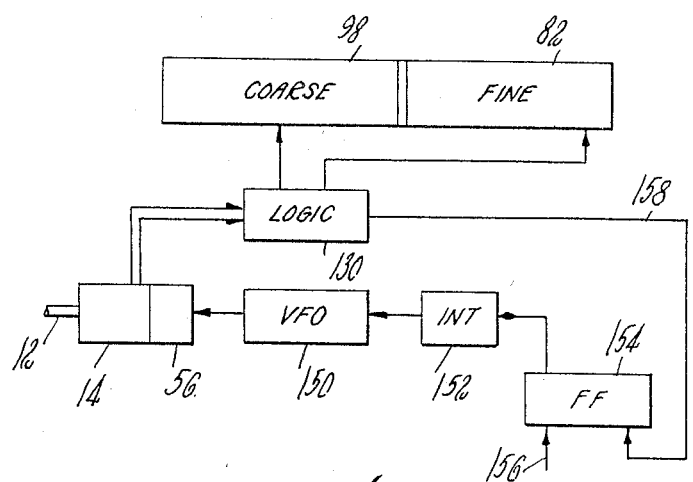
FIG. 9 is a diagram illustrating logic employed to control the rotor drive for the encoder.

A second amplification of the basic shaft encoder arrangement is shown in FIG. 9. Read-out generation of a position indication by the shaft encoder may be requested by a read pulse such as a gated clock pulse in certain applications. In such circumstances it is desirable that the $V_O$ pulse be generated as nearly as possible at the same time as the read pulse. The arrangement shown in FIG. 9 provides a system for coordinating the generation of this pulse with a gated read pulse by varying the speed at which the rotor 40 is driven by the synchronous motor 56. This effectively varies the timing of the $S_O$ pulse while placing the $V_O$ pulse in substantial synchronism with the gated read pulse. In this circuitry the synchronous motor 56 is driven by a variable frequency oscillator (VFO) 150. The oscillator is biased to generate a base frequency but that frequency may be increased in response to an input voltage. The integrator circuit 152 provides this variable input voltage and is controlled by flip-flop 154. The flip-flop 154, when set by the gated read pulse on line 156, applies a voltage level to the integrator and the integrator produces a rising voltage output that increases the output frequency of the oscillator and drives the motor faster. The next $V_O$ pulse, passed on line 158, clears the flip-flop and removes the conditioning level from the integrator so that the variable frequency oscillator returns to its base frequency. The duration of increased drive speed therefore is directly proportional to the time interval between the read pulse and the $V_O$ pulse and the resulting effect of this operation is to advance the $V_O$ pulse in time. As a result the $V_O$ pulse should occur at a point closer to the gated read pulse during the next cycle. While this is essentially an on-off servo system it will be understood by those skilled in the art that other types of servo systems such as a zero-error positional servo system could be utilized to produce similar results.

A second embodiment of the apparatus of the invention is shown in FIGS. 10 and 11. This apparatus utilizes variable capacitance principles and employs two sets of discs in the form of printed circuits which form the plates of the capacitors. The apparatus includes a stator housing 10' to which is connected a disc 170 on which is provided two tracks 16' and 18' of capacitor elements 172. These capacitor tracks correspond to the stator tracks of the variable reluctance device (FIGS. 1–5) and have been assigned the same reference numerals distinguished by a prime. An input member shaft 12' supported in bearings 34' carries a similar disc 174 on which is provided corresponding tracks 30' and 32' of capacitor elements 172. The rotor 40', which is a flat disc, is driven by shaft 50' and has capacitor discs 176, 178 cemented on either side thereof formed to include four sets of tracks thereon, 42', 44', and 46' and 48' respectively. A side elevational view of the rotor disc and the capacitor disc 178 mounted thereon is shown in FIG. 11. As indicated in that figure there are twelve connected capacitance segments 172 in the outer tracks 48' and eleven similar capacitor segments 172 in the inner track 46'. The tracks 16', 30' and 44' correspondingly each have eleven connected segments and tracks 18', 32' and 42' correspondingly each have twelve connected segments. As the rotor 40' is driven relative to the stator 14' there is only one point at which all of the segments in disc 178 are aligned with the segments in disc 170. At this point the capacitance effect is such that the maximum signal is produced from both sets of capacitors and this is indicative of the reference point $S_O$. In similar manner the segments in the two sets of corresponding tracks between the input member 12' and the rotor 40' are in coincidence only at one point, at which a maximum signal $I_O$ is produced. The similarity of arrangement principles to the variable reluctance device shown in FIGS. 1–5 is believed obvious. These two values $S_O$ and $I_O$ control the gates to establish the Coarse count. The vernier count is initiated by the signal $V_O$ which is generated by coincidence between the signals from the input member track 30' and the stator track 18' in the same manner as described above in conjunction with the description of the variable reluctance device and similar logic is utilized to provide a position indication from this data. The apparatus thus provides a second form of compact, accurate position indicating device.

A third embodiment of the invention is shown in FIG. 12. This is a linear position indicating device having a stator 180 and a movable member 182 which functions as the input member. As illustrated it incorporates variable reluctance principles, the stator 180 and input member 182 each having a series of corresponding slotted portions 184, 186 and 188, 190. Associated with each slotted portion is a coil of wire 192 which is responsive to a flux field in a manner similar to the apparatus shown in FIGS. 1–5. The stator transducer portion 184 has $N$ slots per unit length while the portion 186 has $N+1$ slots. Similarly the corresponding portions 188 and 190 on the input member 182 have $N$ and $N+1$ slots respectively. A rotor member 194 is positioned between the stator and the input member, and has a first helically grooved portion 196 which has a pitch of $N$/unit length so that there are $N$ thread crests per unit length and a second helically grooved portion 198 which has $N+1$ threads per unit length. It is believed that the similarity between this structure and the arrangements shown in FIGS. 1 and 8 as far as the transducer tracks and the associated rotor member are concerned will be evident. The rotor 194 may be driven intermittently or at a constant speed and the apparatus produces output signal trans as the flux changes in the associated transducer tracks proportional to the variation in the total air gap effect similar to the trains of signals described in conjunction with FIGS. 1–6. The input member may be moved in any suitable manner such as by the shaft member 200 and its position can be accurately determined with fine and coarse count indications as above decribed. Another linear measuring device could be made by combining a windup drum with one of the forms of angular measuring devices described above. A wire on the drum which follows the linear displacement to be measured would cause the drum to be rotated as a function of the linear displacement and therefore the measurement of the rotational displacement would be a direct and highly accurate indication of the magnitude of the linear displacement.

Thus it will be seen that the invention provides an improved position encoding apparatus which provides rapid and accurate read-out with both vernier and gross indications. The apparatus provides automatic elimination of ambiguity and inherent signal averaging so that substantial tolerances in the construction of the apparatus do not impair its accuracy. This apparatus of the invention is a compact device which may be manufactured in a variety of configurations and has numerous applications to a wide variety of position measuring problems. It is appreciated that various modifications in the illustrated embodiments other than those mentioned above will occur to those skilled in the art. For example, other types of transducing systems, such as those utilizing radiation and optical sensing principles, might be employed in practicing the invention. Other types of stator and input member reference generating means, such as a single indicium on the track to provide the reference, may be utilized in a modified encoder configuration. Coarse and fine counts may be accumulated in the two counters at the same time with associated modified ambiguity eliminating logic. In another specific example, the updating technique shown in FIG. 8 may be employed with a single register which is responsive both to the digital encoder logic and to the incremental encoder logic if periodic delays in read-out can be tolerated. Therefore, while preferred embodiments of the invention have been shown and described it is not intended that the invention be limited thereto or to details thereof and departures may be made therefrom within the spirit and the scope of the invention as defined in the claims.

We claim:

1. Position indicating apparatus for indicating the position of one structure relative to another comprising first and second members adapted to be moved relative to one another in accordance with the positions of said structures, each member having a set of equally spaced indicia thereon, one set having one more indicium per unit length than the other set, a cooperating member disposed adjacent said first and second members, said cooperating member including two sets of equally spaced cooperating elements, each set of cooperating elements being positioned adjacent a corresponding indicia set, each set of cooperating elements having the same number of elements as the corresponding indicia set on said first and second members, means to drive said cooperating member so that its cooperating elements move past the sets of indicia on said first and second members in a cyclical manner, signal producing means associated with each set of indicia and its corresponding set of cooperating elements including means to produce a coincidence signal upon the simultaneous sensing of positions of coincidence between the indicia in each set and their cooperating elements, means to produce a series of count signals during each cycle of said cooperating member, and means responsive to said count signals and said coincidence signals to provide a vernier indication of the relative positions of said structures.

2. The apparatus as claimed in claim 1 wherein each set of indicia includes a wall portion of varying height to provide a series of equally spaced crests and said cooperating member includes a corresponding structure positioned adjacent said wall portion having the same number of equally spaced crests, said cooperating member being adapted to generate a magnetic flux and said wall portion having a flux responsive element disposed therein, the flux sensed by said flux responsive element varying as said cooperating member is moved past said wall portion.

3. Position indicating apparatus for indicating the position of one structure relative to another comprising first and second members adapted to be moved relative to one another in accordance with the positions of said structures, each member having two sets of equally spaced indicia thereon, one set on each member having one more indicium per unit length than the other set on the member, a cooperating member disposed adjacent said first and second members, said cooperating member including four sets of equally spaced cooperating elements, each set of cooperating elements being equal in number to the indicia in the corresponding set on said first and second members, means to drive said cooperating member so that its cooperating elements move past the sets of indicia on said first and second members in a cyclical manner, signal producing means associated with each indicia set and its corresponding cooperating set including first means adapted to produce a signal upon sensing a position of coincidence between indicia in the two sets on each of said members and second means adapted to produce a signal upon sensing a position of coincidence between indicia in one set on each member, and means to count indicia in one of said sets between the positions of sensed coincidence, said signals being adapted to control the operation of said counting means to provide gross and vernier digital indications of the positions of said structures.

4. The apparatus as claimed in claim 3 wherein each set of indicia includes a wall portion of varying height to provide a series of equally spaced crests and said cooperating member includes a corresponding structure positioned adjacent said wall portion having the same number of equally spaced crests, said cooperating member being adapted to generate a magnetic flux and said wall portion having a flux responsive element disposed therein, the flux sensed by said flux responsive element varying as said cooperating member is moved past said wall portion.

5. The apparatus as claimed in claim 3 and further including ambiguity eliminating means comprising means to sense the size of the vernier indication and means responsive to said vernier indication sensing means to control the operation of the gross indication recording means to insure inclusion of the last count signal when the vernier count is less than a predetermined quantity and to insure exclusion of the count signal after the last count signal when the vernier count is more than said predetermined quantity.

6. The apparatus as claimed in claim 5 wherein said vernier indication sensing means includes a bistable device and means to change its state when said vernier count is greater than said predetermined quantity so that a count signal is recorded by said gross indication recording means.

7. Position indicating apparatus for providing an accurate digital indication of the position of one structure relative to another comprising first and second members adapted to be moved relative to one another in accordance with the positions of said structures, each said member having two tracks of equally spaced indicia thereon, one of the tracks on each member having at least one more indicium per unit length than the other track on that member, a sampling member disposed adjacent said first and second members, said sampling member carrying four tracks of equally spaced indicia, each sampling track being aligned with a corresponding track on said first and second members, each sampling track having in-indicia equal in number to the indicia on the corresponding track on said first and second members, means to move said sampling member past the tracks on said first and second members in a cyclical manner, means associated with said sampling member for sensing positions of coincidence between indicia in the two tracks on each of said first and second members and the associated sampling tracks and the indicia in one track on said first member and the indicia in a track on said second member having a different total number of indicia than said one track and their associated sampling tracks, means responsive to indicia in one of said tracks to produce count pulses, a fine counter, a coarse counter, and means responsive to the sensed positions of coincidence to control the application of said count pulses to said counters.

8. Position encoding apparatus for providing a digital indication of the position of one structure relative to another structure comprising first and second members connected to said structures so that they are movable relative to one another in accordance with the position of said structures, each member having a channel and a signal conductor positioned in said channel, each channel having a wall portion of regularly varying height such that a series of equally spaced crests are provided, one of said channels having at least one more wall crest per unit length than the other channel, a flux generating rotor element disposed adjacent said first and second channels, said rotor having similar portions of varying height adjacent each wall portion of said first and second members, each corresponding rotor portion having the same number of crests as the adjacent channel wall portion, means to drive said rotor portions past the channels of said first and second members so that the flux induced in said signal conductors varies in accordance with the positions of said wall portions, means responsive to the varying signal trains induced in said conductors to produce a signal on sensing a coincidence between the signal trains from said first and second members, and counting means controlled by said signal producing means to provide a vernier indication of the position of said structures.

9. Position encoding apparatus for providing a digital indication of the position of one stucture relative to another structure comprising first and second members connected to said structures so that they are moved relative to one another in accordance with the position of said structures, each member having means to provide a coarse position reference signal, a wall portion of regularly varying height such that, a series of equally spaced crests are provided, and a signal conductor positioned adjacent said wall portion, one of said walls having at least one more crest per unit length than the other wall, a flux generating rotor element disposed adjacent said first and second walls, said rotor having similar portions of varying height adjacent each wall portion of said first and second members, each corresponding rotor portion having the same number of crests as the adjacent wall portion, means to drive said rotor portions past the channels of said first and second members so that the flux induced in said signal conductors varies in accordance with the positions of said wall portions, means responsive to the varying signal trains induced in said conductors to produce a vernier indication signal on sensing a position of coincidence between the signal trains from said first and second members, a fine counter, a coarse counter, count pulse generating means, means normally operative in each cycle responsive to a sensed vernier indication to apply said count pulses to said fine counter, means responsive to the next coarse position reference signal to transfer application of count pulses from said fine counter to said coarse counter, and means responsive to the second coarse reference indication to inhibit application of said count pulses to either counter.

10. Position encoding apparatus for providing a digital indication of the position of one structure relative to another structure comprising means to provide coarse reference indications of the positions of each said structure, vernier indication means to provide a fine indication of the relative positions of said structures, a fine counter, a coarse counter, count pulse generating means, means responsive to said fine indication and one of said coarse reference indications to control the application of count pulses to step said fine counter, means responsive to said first and second coarse reference indications to control the application of count pulses to said coarse counter, and means to effectively advance the application of count pulses to said coarse counter when said fine count is small and to delay the application of count pulses to said coarse counter where said fine count is larger to eliminate a possible ambiguity in said coarse count.

11. Position encoding apparatus for providing a digital indication of the position of one structure relative to another structure comprising means to provide coarse reference indications of the positions of each said structure, vernier indication means to provide a fine indication of the relative positions of said structures, a fine counter, a coarse counter, count pulse generating means, means normally operative in each cycle responsive to a sensed vernier coincidence to apply said count pulses to said fine counter, means responsive to the next coarse reference indication to transfer application of count pulses from said fine counter to said coarse counter, and means responsive to said second coarse reference indication to inhibit application of said count pulses to either counter.

12. The apparatus as claimed in claim 11 and further including a read out register having sections corresponding to said fine counter and said coarse counter, and means to transfer the indications stored in said fine and coarse counters to said read out register during each cycle.

13. The apparatus as claimed in claim 11 and further including means to update the quantity stored in said fine and coarse counters between intervals of information read out comprising means to sense the direction of movement of said structures and means to periodically step said fine and coarse counters corresponding to the sensed direction of movement of said structures.

14. The apparatus as claimed in claim 11 and further including a read out register having sections corresponding to said fine counter and said coarse counter, means to transfer the indications stored in said fine and coarse counters to said read out register during each cycle, and means to update the quantity stored in said read out register between intervals of information transferral to said read out register comprising means to sense the direction of movement of said structures and means to periodically step said read out register corresponding to the sensed direction of movement of said structures.

15. Position encoding apparatus for providing a digital indication of the position of one structure relative to another structure in response to a gated request pulse comprising means to provide a coarse reference indicative of the position of one structure, means to provide a coarse reference of the position of the second structure, first and second members connected to said structures, a rotor element adapted to be driven past and first and second members to provide a fine indication of the positions of said members, a fine counter, a coarse counter, count pulse generating means, means responsive to the fine indication and one of said coarse reference indications to control the application of count pulses to step said fine counter, means responsive to said first and second coarse reference indications to control the application of count pulses to said coarse counter, and means to control the drive of said rotor element to substantially synchronize in time the occurrence of said fine indication with said gated request pulse.

16. The apparatus as claimed in claim 15 wherein said rotor is driven by a synchronous motor and further including a variable frequency supply for said motor, and means to control the frequency of said supply in accordance with the time interval between each request pulse and the next fine indication.

17. Position encoding apparatus for providing a digital vernier indication of the position of a stator structure relative to a movable structure comprising first and second members connected to said stator and movable structures respectively, each of said members having a series of equally spaced indicia thereon with at least one more indicium per unit length in the series on one of said members than on the other member, a rotor element disposed adjacent said first and second members, said rotor element having two series of indicia similar to the series of indicia on said first and second members, each series of indicia on the rotor element having the same number of indicia as the number of indicia in the series on the corresponding member, means to generate flux flow between said rotor and said members, means to drive said rotor past said members so that the flux varies in accordance with the positions of said indicia to produce a varying signal train from each member, means to generate position indicating signals, and means responsive to the generated varying signal trains to produce a signal on sensing a point of coincidence between said signal trains to control the recording of said position indicating signals.

18. Position encoding apparatus for providing a digital vernier indication of the position of a stator structure relative to a movable structure comprising first and second channel members mounted on said stator structure, a signal conductor positioned in each channel, one of said channels having a wall portion of regularly varying height so that a series of equally spaced crests are provided, the other channel having a wall extension portion mounted to be movable with said movable structure as a unit, said wall extension portion being of regularly varying height so that a series of equally spaced crests are provided, one of said channels having associated with it at least one more wall crest per unit length than the other channel, a rotor element disposed adjacent said first and second channels, said rotor having similar portions of varying height adjacent each said wall portion, each corresponding rotor portion having the same number of crests as the adjacent channel wall portion, means to generate flux flow between said rotor portions and channel wall portions, means to drive said rotor portions past said channels so that the flux varies in accordance with the positions of said wall portions and produces varying signal trains in said signal conductors, means to generate position indicating signals, and means responsive to the varying signal trains induced in said conductors to produce a signal on sensing a point of coincidence in the signal trains from said first and second channels to provide a digital vernier indication of the position of said stator structure relative to said movable structure.

19. Position indicating apparatus for indicating the position of one structure relative to another structure comprising first and second members adapted to be moved relative to one another in accordance with the positions of said structures, cooperating means disposed adjacent said first and second members for sensing the position of said members and generating a sinusoidal signal train in response to the sensed position of each of said members, phase sensing means for sensing the phase relation between signal trains applied thereto and producing an output indicative of that phase relation, means to apply said sinusoidal signal trains to said phase sensing means, said phase sensing means be an electrical element responsive to the phase difference between said two sinusoidal signal trains, which element includes an output shaft which rotates in response to a sensed change in phase between said sinusoidal signal trains, and means responsive to the movement of said output shaft to produce a signal indicative of the relative position of said structures.

20. Position indicating apparatus for indicating the position of one structure relative to another structure comprising first and second members adapted to be moved relative to one another in accordance with the positions of said structures, each member having a set of equally spaced indicia thereon, one set having one more indicium per unit length than the other set, cooperating means disposed adjacent said first and second members for sensing said indicia and generating a sinusoidal signal train in response to the sensed indicia of each of said members, a synchro including a rotatable output shaft for sensing the phase relation between signal trains applied thereto, said output shaft rotatating as a function of the phase relation of the applied signal trains, means to apply said sinusoidal signal trains to said phase sensing means, and an incremental shaft position encoder responsive to the rotation of said output shaft to provide an indication of the relative positions of said structures.

21. The apparatus as claimed in claim 20 wherein each said member includes a variable reluctance portion arranged so that said reluctance varies corresponding to said set of indicia and means to generate magnetic flux, said sinusoidal signal trains being generated in response to the changing magnetic flux produced by said variable reluctance portions.

22. An inductive device comprising a first pair of concentrically disposed annular structures of magnetic flux conducting material defining a first toroidal magnetic flux path with an annular air gap between said first pair of structures, a second pair of concentrically disposed annular structures of magnetic flux conducting material defining a second toroidal magnetic flux path with an annular air gap between said second pair of structures, each said structure having two spaced leg members and the leg members of each said pair being disposed immediately adjacent their associated air gap in opposed aligned relation and a series of spaced crests formed on at least one leg member of each structure so that the reluctance of the magnetic flux path varies as said one structure is rotated relative to the other structure of the pair, and one pair of structures having at least one more crest formed on its leg members than the number of crests on the other pair of structures, means supporting one of said structures of each pair for rotation about a common axis relative to the other structure of that pair, means to generate magnetic flux for flow along said toroidal paths between said structures, and annular electrically conductive means disposed coaxially with said structures of each pair and supported by one of said structures of each pair, each said electrically conductive means producing an electrical signal output in response to changes in the magnetic flux flowing in said path as a function of the relative movement of said crests.

23. A position encoding apparatus comprising means to generate two trains of signals (S and S+1) which have a coincidence at one point in each cycle and are related to a first member, means to generate a second pair of signal trains (I and I+1) which have a coincidence at one point in each cycle and are related to a second member, means to detect the coincidence between said first pair of signal trains, means to detect the coincidence between said second pair of signal trains, and means to detect a coincidence between one signal train of said first set and one signal train of said second set, first and second counters, means to step said counters in response to the signals in one of said trains, and means responsive to the detected coincidence values to control the stepping of said two counters.

24. The apparatus as claimed in claim 23 wherein each said signal train generating means includes an inductive device comprising a first pair of concentrically disposed annular structures of magnetic flux conducting material defining a first toroidal magnetic flux path with an annular air gap between said first pair of structures, a second pair of concentrically disposed annular structures of magnetic flux conducting material defining a second toroidal magnetic flux path with an annular air gap between said second pair of structures, each said structures having two spaced leg members and the leg members of each said pair being disposed immediately adjacent their associated air gap in opposed aligned relation and a series of spaced crests formed on at least one leg member of each structure so that the reluctance of the magnetic flux path varies as said one structure is rotated relative to the other structure of the pair, and one pair of structures having at least one more crest formed on its leg members than the number of crests on the other pair of structures, means supporting one of said structures of each pair for rotation about a common axis relative to the other structure of that pair, means to generate magnetic flux for flow along said toroidal paths between said structures, and annular electrically conductive means disposed coaxially with said structures of each pair and supported by one of said structures of each pair, each said electrically conductive means producing an electrical signal output in response to changes in the magnetic flux flowing in said path as a function of the relative movement of said crests.

References Cited by the Examiner
UNITED STATES PATENTS

| | | | |
|---|---|---|---|
| 3,045,230 | 7/1962 | Tripp et al. | 340—347 |
| 3,099,831 | 7/1963 | Jones | 340—347 |
| 3,167,756 | 1/1965 | Rachwal et al. | 340—347 |
| 3,196,426 | 7/1965 | Kirkness et al. | 340—347 |

MAYNARD R. WILBUR, *Primary Examiner.*

S. W. CAPELLI, W. J. KOPACZ, L. W. MASSEY,
*Assistant Examiners.*